(12) United States Patent
Christensson et al.

(10) Patent No.: US 6,795,582 B2
(45) Date of Patent: Sep. 21, 2004

(54) METHOD FOR PROCESSING A STREAM OF PICTURES

(75) Inventors: Björn Christensson, Nacka (SE); Göran Appelquist, Hägersten (SE); Peter Weiss, Hägersten (SE)

(73) Assignee: Digital Vision AB, Stockholm (SE)

( * ) Notice: Subject to any disclaimer, the term of this patent is extended or adjusted under 35 U.S.C. 154(b) by 685 days.

(21) Appl. No.: 09/838,323

(22) Filed: Apr. 20, 2001

(65) Prior Publication Data

US 2002/0154824 A1 Oct. 24, 2002

(51) Int. Cl.[7] ................................................. G06K 9/36
(52) U.S. Cl. ..................................... 382/236; 382/239
(58) Field of Search ............................... 382/275, 239, 382/236; 348/699, 97, 607; 375/240.14, 240.02

(56) References Cited

U.S. PATENT DOCUMENTS 6,324,545 B1 * 11/2001 Morag ........................ 707/202
6,522,693 B1 * 2/2003 Lu et al. ................. 375/240.02

OTHER PUBLICATIONS

Wolf et al., "Objective Quality Assessment of Digitally Transmitted Video", IEEE, May 1991, vol. 2, pp. 477–482.*

* cited by examiner

*Primary Examiner*—Anh-Hong Do
(74) *Attorney, Agent, or Firm*—Birch, Stewart, Kolasch & Birch, LLP

(57) ABSTRACT

The invention relates to a method and an apparatus for processing a stream of pictures. The method comprises the steps of selecting a first portion of pictures from a stream of pictures fulfilling a quality measure for processing in a first processing unit PROC1, and selecting a second portion of pictures not fulfilling said quality measure for processing in a second processing unit PROC2. The first portion of the pictures selected are processed in the first processing unit PROC1, and the second portion of the pictures are processed in the second processing unit PROC2. Finally, the first portion of the pictures processed in the first processing unit PROC1 are combined with the second portion of the pictures processed in the second processing unit PROC2.

19 Claims, 5 Drawing Sheets

METHOD FOR PROCESSING A STREAM OF PICTURES

FIELD OF THE INVENTION

The present invention relates to a method and an apparatus for processing a stream of pictures, such as motion pictures. In particular, it relates to a method and an apparatus for motion picture processing using two separate processes.

BACKGROUND OF THE INVENTION

A general problem with prior art methods for real time motion picture processing is that no provisions are made for automated correction of pictures or picture sequences which the real time processing method cannot handle or handles insufficiently well. The very concept of real time processing of a discrete series of data, whether motion picture processing or not, implies that, without buffering, a fixed and typically short period of time, according to human standards, is available for processing of each time discrete data set. Using buffers, the period of time available for processing of a finite number of sequential pictures may be temporarily increased, at the expense of the time available for the other pictures. The average time available does however remain constant. Manually selecting the pictures in need of alternative or further processing, is naturally a possible solution, but the need for a subsequent manual selection is costly and time consuming.

SUMMARY OF THE INVENTION

It is an object of the present invention to provide a method and an apparatus for processing a stream of pictures, which avoids the problem with prior art methods.

The object is achieved with a method according to claim 1 and an apparatus according to claim 17.

The present invention relates to a method for automated motion picture processing, which comprises the steps of selecting pictures, or portions of pictures, fulfilling a criterion for any measurable quantity, such as a quality measure, for processing in a first processing unit, which is a real time processing unit, and processing the pictures, or portions of pictures, not fulfilling the quality measure in a second processing unit, which can be a non real time processing unit. After processing the pictures selected for processing in the two units, the pictures are combined in correct order.

The method can be realised by stopping the stream of pictures while a picture is processed in the second processing unit, or the pictures processed in the first processing unit are stored in a buffer picture memory, before being combined with the pictures processed in the second processing unit.

DESCRIPTION OF A PREFERRED EMBODIMENT

Figure 1:
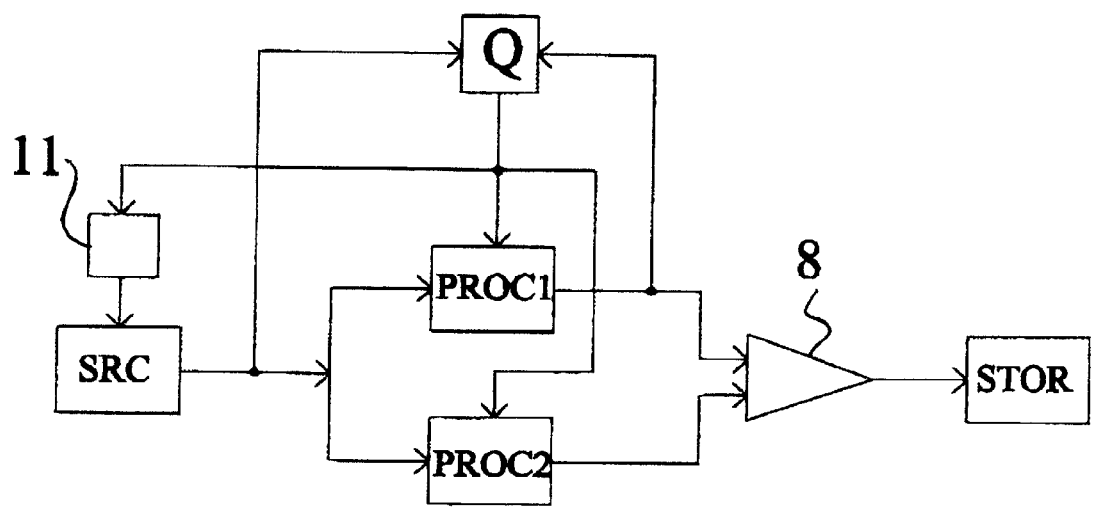
FIG. 1 shows a first embodiment of the invention.

FIG. 1 shows an embodiment of the invention, where the stream of pictures from a source unit SRC, such as a digital picture storage device, a video disc recorder, a computer or any other motion picture storage means, is stopped by a picture stream controller 11, while a picture is processed in a second processing unit PROC2, which is a non real time processing unit. The picture stream controller 11 and the first and second processing units PROC1 and PROC2 respond to control signals from a picture quality evaluation unit Q, which evaluates one or several aspects of the picture quality, and sends a control signal whose value depends on the evaluated picture quality. The picture quality measure can be based on picture properties before being processed, or after being processed in the first processing unit PROC1, it may be based on a comparison between the picture properties before and after being processed, or it may be based on a combination of these. A picture stream combination unit 8 combines the two streams of pictures from the first and second processing units PROC1, PROC2 and outputs the signal to a receptor unit STOR, which may be a VCR, or any other motion picture storage means. obviously, although illustrated as two separate elements, the source unit SRC and the receptor unit STOR may be embodied as a single unit combining the two functions.

The picture streams from the processing units PROC1, PROC2 are generally intermittent, as the non real time processing unit PROC2 halts the output of pictures while processing. In order to achieve a continuous stream of pictures from the picture stream combination unit 8, it is necessary, in this embodiment, to provide a buffer memory (not illustrated). Obviously, although illustrated as two separate elements, the picture stream combination unit 8 and the receptor unit STOR may also be embodied as a single unit combining the two functions.

The first processing unit PROC1 may process all pictures which are input to it, or it may process only those which are not processed by the non real time processing unit PROC2. In many cases, information needs to be exchanged between the two processing units PROC1, PROC2, e.g. if the first processing unit PROC1 performs processing utilising information from several sequential pictures such as for motion estimation, or if some single picture processing parameter varies. Further, if the first and second processes advantageously are performed in sequence, using the physical real time processing unit PROC1 after processing in the non real time processing unit PROC2, or vice versa, the processed picture information could be output from one unit to the other, as is more clearly illustrated in FIG. 2. Although the two processing units are depicted as physically separate elements, they are to understood as being closely associated with each other, exchanging information with each other, or even being physically integrated as a single unit. What effectively distinguish them are the processes which are performed, which are different. The processes run in each of them may actually be of the same kind, although in the real time processing unit PROC1 the output results within the period of time needed to perform real time processing, while in the non real time processing unit PROC2 the output often is delayed longer.

The picture quality evaluation unit Q measures some property of the pictures, such as a noise level higher than acceptable, errors which cannot be corrected in the real time processing unit PROC1 etc. The parameters which set the limit for what is an acceptable picture or picture sequence quality, can naturally be set by an operator. The output signal, or signals, from the picture quality evaluation unit Q indicates whether the picture quality is acceptable or not. In case it is acceptable, the pictures are processed in the first processing unit PROC1, while if it is not, the second processing unit PROC2 receives information that the picture needs to be processed, and, in this embodiment, the picture stream controller 11 stops the steam of pictures from the source unit SRC. As many source units SRC, such as certain types of VCR's cannot be stopped and restarted without risk of loosing picture information or loosing track of the picture sequence order, the system may comprise a buffer memory.

Figure 2:
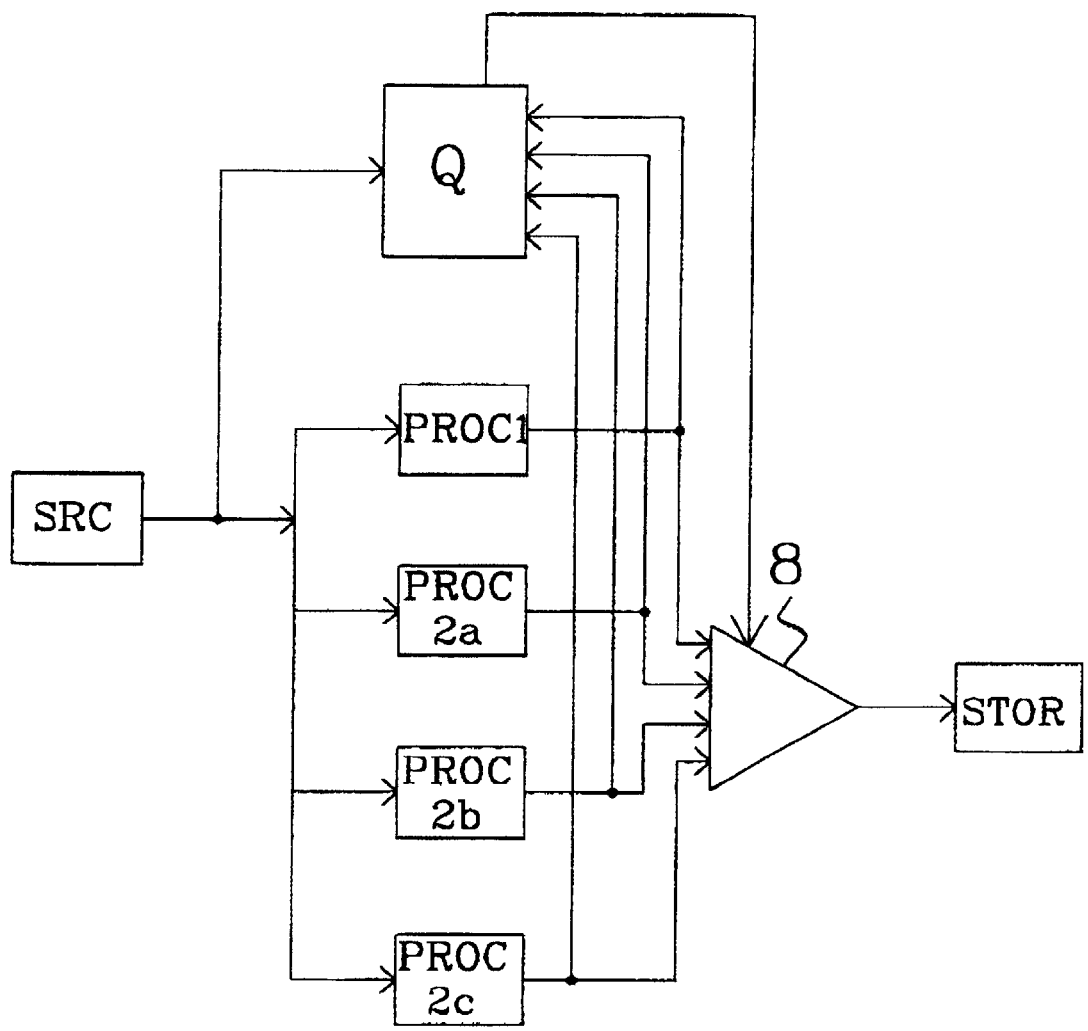
FIG. 2 shows a second embodiment of the invention.

FIG. 2 shows a second embodiment of the invention, where the pictures are processed in parallel in the first processing unit PROC1 and in three secondary processing units PROC2a–c. A quality measure is evaluated for each of the resulting outputs from each of the processing units PROC1, PROC2a–c. If the quality measure for processing unit PROC1 is sufficient, it is unnecessary to evaluate the quality measures for the secondary processing units PROC2a–c, and complete the processing performed by these processes. If, however, the quality measure for processing unit PROC1 is insufficient, it is necessary to evaluate the quality measures for at least one of the secondary processing units PROC2a–c, and complete the processing performed by at least one of these processes, The output result from processing in a processing unit PROC1, PROC2a–c fulfilling a given quality measure is selected by the picture quality evaluation unit Q for output to the receptor unit STOR. The four processing units PROC1, PROC2a–c may or may not be real time processing units, although often the secondary processing units PROC2a–c are non real time processing units, and in such a case some kind of buffer might be needed in the system, although this has been suppressed in order to simplify the figure.

In FIG. 2, the second processing unit PROC2 is illustrated as being comprised of three separate secondary processing units PROC2a–c, operating in parallel with each other and in parallel with the first processing unit PROC1. Obviously, although not illustrated, any one of the secondary processing units PROC2a–c may receive as input the output of any one of the other processing units PROC1, PROC2a–c, thus not operating in parallel with the other units. As the skilled practitioner would understand, any number of processing units may be combined in parallel, or in sequence More generally, if two or more of the different processing units PROC1, PROC2a–c operate in real time, the distinction between processing units PROC1 and PROC2, looses its importance, and one could just as well define all processing units operating in real time be defined as parts of processing unit PROC1, and all processing units not operating in real time be defined as parts of processing unit PROC2.

Figure 3:
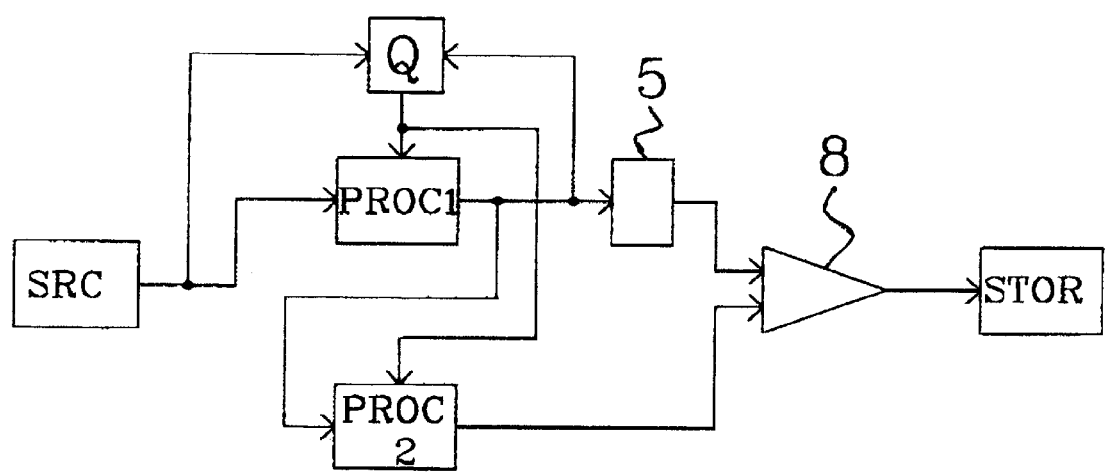
FIG. 3 shows a third embodiment of the invention.
Figure 4:
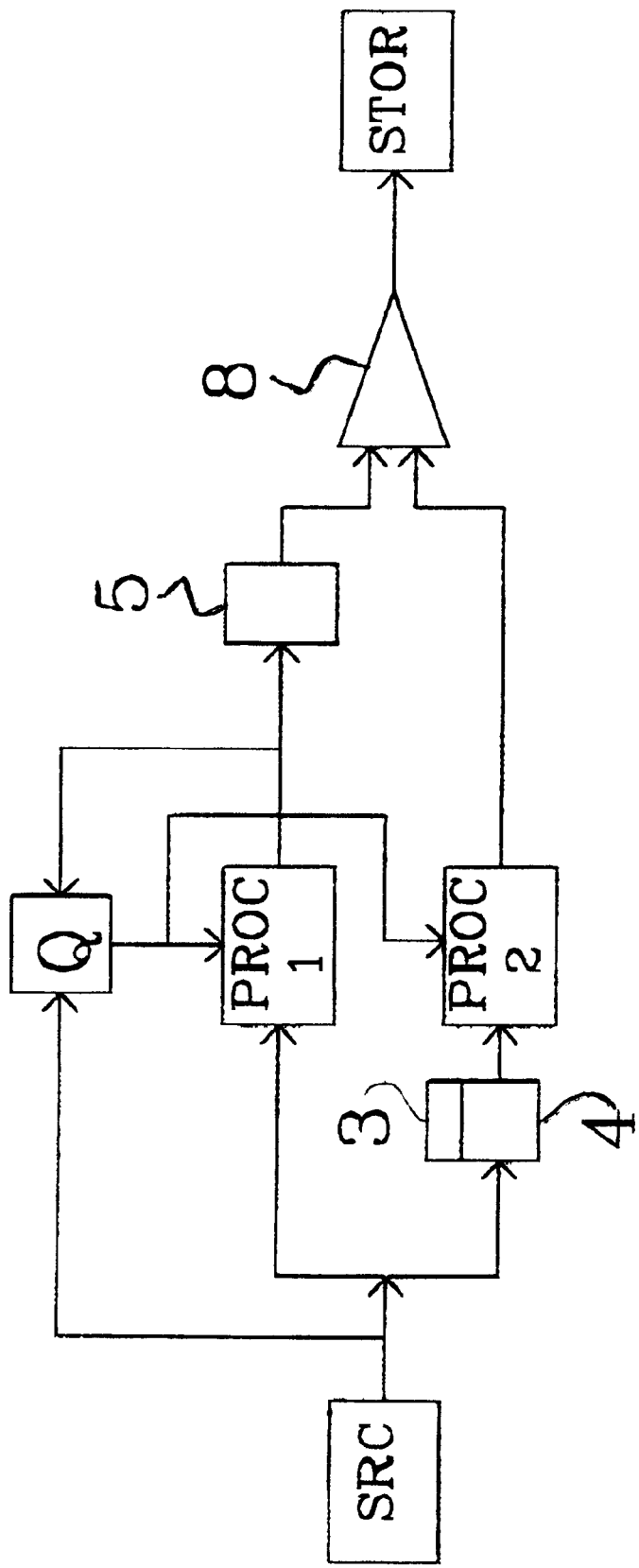
FIG. 4 shows a fourth embodiment of the invention.

FIGS. 3 and 4 show two further embodiments of the invention, where the stream of pictures is not stopped while the second unit PROC2 is processing, but the stream of pictures being output from the first processing unit PROC1 is buffered in a memory 5 while the second processing unit PROC2 is operative. The buffer memory 5 may be a frame store, disc recorder, or any other suitable memory, and it may be physically integrated into the first processing unit PROC1 or the picture stream combination unit 8.

In FIG. 3, all pictures are processed in the first processing unit PROC1, and those pictures not fulfilling a certain minimum value of a quality measure are selected for further processing in the second processing unit PROC2. If the result of the quality measurement is available only when the first process step has been completed, this has the advantage that the result of the first process may be utilised without increasing the total processing time needed.

FIG. 4 shows a fourth embodiment of the invention, which illustrates further aspects of the invention. It comprises a picture memory 4, which buffers the picture stream sent to the second processing unit PROC2. With this picture memory 4 is associated a sequence number memory 3, which keeps track of the sequential order of the pictures stored in the picture memory 4. The sequence numbers associated with each picture, may accompany each picture through the whole system, and although not explicitly illustrated, such an associated sequence number memory 3 could, and in some cases must, be included in each buffer memory, for the purpose of combining the processed pictures in correct order. Alternatively, information regarding in which processing unit PROC1, PROC2, the picture has been processed, may be sufficient for recombining the processed pictures in correct order.

FIG. 4 also illustrates that the picture quality evaluation unit Q may receive input both directly from the source unit SRC, and from the output of the first processing unit PROC1. An evaluation of the picture quality is made at both these positions, or a comparison between the picture before and after processing is made, and the output from the picture quality evaluation unit Q is obtained in response to these results.

The quality measure which is evaluated could be noise level, errors occurring, colour imbalances or any other parameter that can be corrected or otherwise changed in the second processing unit PROC2. The term quality should here be used in the more general sense of any property, as the operator may for artistic reasons intentionally desire to change some feature in a way which may be seen as a deterioration of the picture properties. As, an example, an operator may desire to change the picture properties such as to artificially age the pictures, intentionally adding scratches or unevenness to the pictures. Naturally, the second processing unit PROC2 may perform any of, or several, different picture processes, chosen according to the output of the picture quality evaluation unit Q. This assumes that the output of the picture quality evaluation unit Q indicates not only that the picture quality is insufficient or has flaws of a kind that cannot be corrected for by the second processing unit PROC2, but also which kind of insufficiency or flaw that has been detected. In response to this information the second processing unit PROC2 may perform one process chosen among several available processes, or several available processes may be performed in sequence, or in parallel. Different portions of the picture could be processed differently, in parallel, and the resulting processed portions are then recombined before being output to the picture stream combination unit 8.

Figure 5:
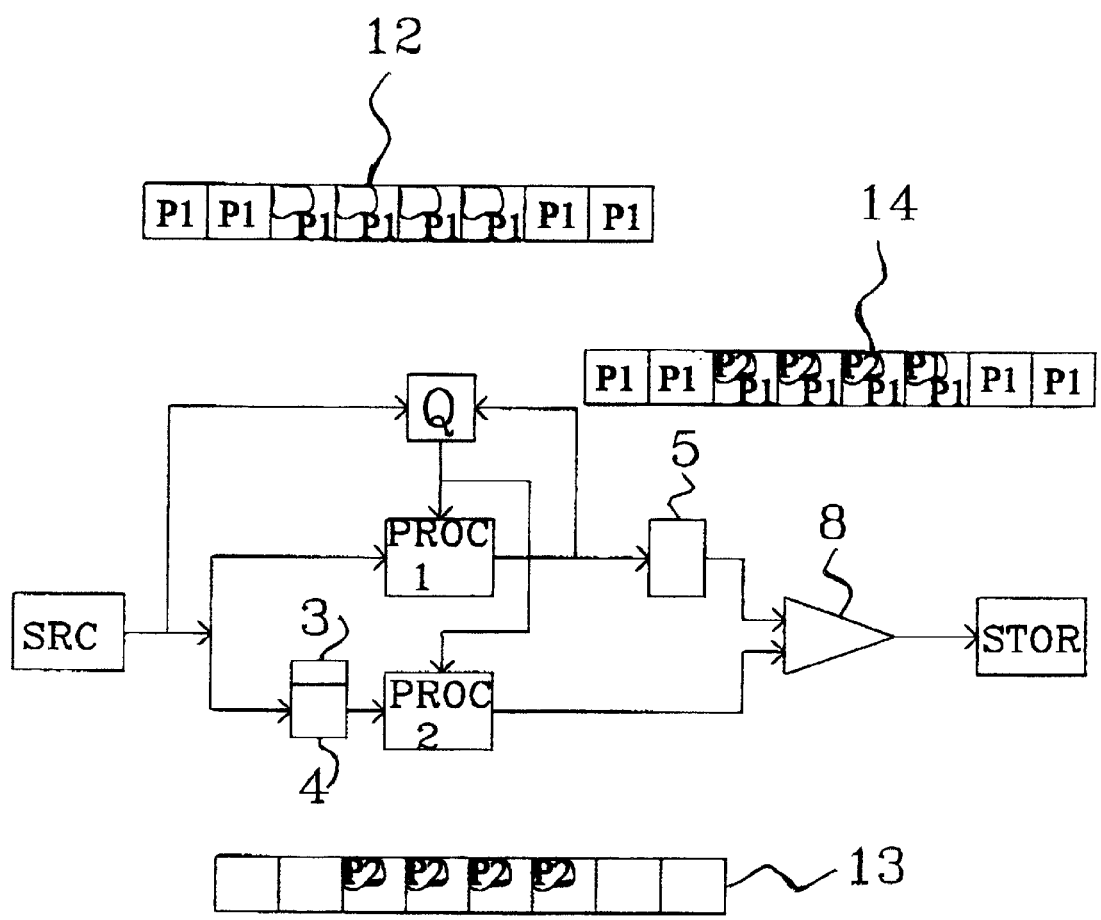
FIG. 5 shows a different aspect of the fourth embodiment of the invention.

FIG. 5 shows the fourth embodiment of the invention, illustrating a method selecting only portions of certain pictures not fulfilling a minimum quality value for processing in the second processing unit PROC2. A sequence of eight frames 12–14 are shown, of which portions of the frames three through six are selected for processing in the second processing unit PROC2. At 12, the two first and the two last frames are processed by the first processing unit PROC1. Only the portions of frames three through six which are not selected for processing in the second processing unit, may be processed in processing unit PROC1, or alternatively the whole frames may be processed in processing unit PROC1 for further processing in processing unit PROC2, although not explicitly shown. At 13, the portions of the frames three through six not fulfilling the minimum quality value are being processed by the second processing unit PROC2. Finally, at 14, the portions of the frames being processed in the two processing units are combined.

What is claimed is:

1. A method for processing a stream of pictures, comprising the steps of from a stream of pictures, selecting a first portion of pictures fulfilling a quality measure for processing in a first processing unit (PROC1), and selecting a second portion of pictures not fulfilling said quality measure for processing in a second processing unit (PROC2), and processing the first portion of the pictures selected for processing in the first processing unit (PROC1) in that unit, and processing the second portion of the pictures selected for processing in the second processing unit (PROC2) in that unit, and combining, in correct order, the first portion of the pictures processed in the first processing unit (PROC1) with the second portion of the pictures processed in the second processing unit (PROC2).

2. A method according to claim 1, characterised in that the first portion of pictures fulfilling a quality measure comprises the whole pictures fulfilling the quality measure, and the second portion of pictures not fulfilling said quality measure comprises the whole pictures not fulfilling the quality measure.

3. A method according to claim 1, characterised in that the first processing unit PROC1 processes all pictures, and the second processing unit PROC2 receives input from the output of the first processing unit PROC1.

4. A method according to claim 1, characterised in that the stream of pictures is stopped, while a picture is processed in the second processing unit (PROC2).

5. A method according to claim 1, characterised in that all pictures are associated with a sequence number, and in that at least the sequence numbers of the pictures selected for processing in the second processing unit (PROC2) are stored in a sequence number memory (3).

6. A method according to claim 5, characterised in that the sequence number memory (3) is arranged in a computer.

7. A method according to claim 5, characterised in that
the pictures selected for processing in the second processing unit (PROC2) are stored in a first picture memory (4), and the sequence numbers associated with said pictures are stored in said sequence number memory (3).

8. A method according to claim 5, characterised in that the pictures processed in the first processing unit (PROC1) are stored in a second picture memory (5), before being combined with the pictures processed in the second processing unit (PROC2).

9. A method according to claim 1, characterised in that the quality measure is evaluated prior to picture processing in any of said processing units (PROC1, PROC2).

10. A method according to claim 1, characterised in that all pictures are processed in the first processing unit (PROC1), and in that the quality measure is evaluated after processing in the first processing unit (PROC1).

11. A method according to claim 1, characterised in that
a first quality measure is evaluated prior to picture processing in any of said processing units (PROC1, PROC2), and all pictures are processed in the first processing unit (PROC1), and a second quality measure is evaluated after processing in the first processing unit (PROC1), and the selection of pictures for processing in the second processing unit (PROC2) is performed according to both quality measures.

12. A method according to claim 1, characterised in that the first processing unit PROC1 comprises more than one processing units, and if at least one of these first processing units PROC1 gives an output fulfilling the quality measure, the output from one of these processing units is selected, while if none of these first processing units PROC1 gives an output fulfilling the quality measure, the second processing unit PROC2 is selected for processing the picture.

13. A method according to claim 1, characterised in that
the second processing unit PROC2 comprises more than one secondary processing units PROC2a–c, where if the picture is selected for processing in the second processing unit PROC2, the output from one of the secondary processing units PROC2a–c is selected as output.

14. A method according to claim 1, characterised in that the processing performed in said processing units (PROC1, PROC2) involves at least one of the processes: noise reduction, colour correction, bandwidth shaping, image stabilisation, scratch or dirt concealment, bit rate compression, format compression or detail processing.

15. A method according to claim 1, characterised in that the quality measure is at least one of the quality measures: noise level, signal to noise ratio, picture complexity, scratch or dirt occurrence, frequency content, edge business, colour imbalance, quantization level, or entropy.

16. A method according to claim 1, characterised in that the first processing unit PROC1 is a real time processing unit, and the second processing unit PROC2 is a non real time processing unit.

17. An apparatus for picture processing, comprising
a first picture processing unit (PROC1),
a second picture processing unit (PROC2),
a picture quality evaluation unit (Q), which
is adapted to evaluate each picture in a stream of pictures and to
select those that do not fulfil a quality measure for processing in the second processing unit (PROC2), while
at least those which does fulfil said quality measure are processed in the first processing unit (PROC1),
a picture stream combination unit (8), which
is connected to said first (PROC1) and said second processing units (PROC2), and
is adapted to combine, in correct order, the pictures processed in the first processing unit (PROC1) with the pictures processed in the second processing unit (PROC2).

18. An apparatus according to claim 17, further comprising a picture stream controller (11), which stops the picture stream while a picture is processed in the second processing unit (PROC2).

19. An apparatus according to claim 17, further comprising a picture memory (5), in which the pictures processed in the first processing unit (PROC1) are stored before being combined with the pictures processed in the second processing unit (PROC2).

* * * * *